(12) United States Patent
Lee et al.

(10) Patent No.: US 8,888,351 B2
(45) Date of Patent: Nov. 18, 2014

(54) BACKLIGHT ASSEMBLY AND DISPLAY APPARATUS INCLUDING THE SAME

(75) Inventors: Young-min Lee, Bucheon-si (KR); Kye-hoon Lee, Suwon-si (KR); Kun-ho Cho, Suwon-si (KR); Jeong-phil Seo, Suwon-si (KR); Yong-hun Kwon, Anyang-si (KR); Gil-tae Hur, Suwon-si (KR); Suk-ju Choi, Jeonju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 13/430,213

(22) Filed: Mar. 26, 2012

(65) Prior Publication Data

US 2012/0307518 A1     Dec. 6, 2012

(30) Foreign Application Priority Data

May 31, 2011   (KR) .................. 10-2011-0052259

(51) Int. Cl.
*G02F 1/1335* (2006.01)
*F21V 8/00* (2006.01)

(52) U.S. Cl.
CPC ........ *G02B 6/0068* (2013.01); *G02F 1/133615* (2013.01); *G02B 6/0073* (2013.01); *G02F 2001/133624* (2013.01)
USPC .............................. 362/612; 362/97.3; 362/84

(58) Field of Classification Search
USPC ........................................... 362/84, 612, 97.3
See application file for complete search history.

(56) References Cited

U.S. PATENT DOCUMENTS

| | | | |
|---|---|---|---|
| 2009/0002349 A1 | 1/2009 | Cok et al. | |
| 2009/0034230 A1* | 2/2009 | Lim et al. | 362/84 |
| 2009/0190373 A1* | 7/2009 | Bita et al. | 362/620 |
| 2010/0096993 A1 | 4/2010 | Ashdown et al. | |
| 2010/0103648 A1 | 4/2010 | Kim et al. | |
| 2010/0188601 A1* | 7/2010 | Onishi | 349/61 |
| 2011/0249424 A1* | 10/2011 | Joo et al. | 362/97.1 |

FOREIGN PATENT DOCUMENTS

EP       2 322 961 A1    5/2011
KR    10-2011-0044002 A    4/2011

OTHER PUBLICATIONS

Communication dated Oct. 5, 2012, issued by the European Patent Office in counterpart European Patent Application No. 12158485.8.

* cited by examiner

*Primary Examiner* — Laura Tso
(74) *Attorney, Agent, or Firm* — Sughrue Mion, PLLC

(57) ABSTRACT

A display apparatus and a backlight assembly are provided. The display apparatus includes a display panel; and a backlight unit disposed on a rear surface of the display panel and discharging light to the display panel, the backlight unit comprising white light emitting diodes (LEDs) and Quantum Dot (QD) LEDs.

16 Claims, 6 Drawing Sheets

BACKLIGHT ASSEMBLY AND DISPLAY APPARATUS INCLUDING THE SAME

CROSS-REFERENCE TO RELATED APPLICATIONS

This application claims priority from Korean Patent Application No. 10-2011-0052259, filed on May, 31, 2011, in the Korean Intellectual Property Office, the contents of which are herein incorporated by reference in its entirety.

BACKGROUND

1. Field

Apparatuses, assemblies and articles of manufacture consistent with the present general inventive concept relate to a backlight assembly and a display apparatus including the same, and more particularly, to a backlight assembly supplying a display panel with light and a display apparatus including the same.

2. Description of the Related Art

Liquid Crystal Displays (LCDs) are one of the most widely used types of information display devices and are used in a wide range of applications from a screen for mobile phones to extra large LCD TVs. Since LCDs do not produce light themselves, they use a backlight assembly that projects backlight to convey an image.

Presently used types of LCD backlight are Light Emitting Diode (LED), Electro Luminescent Device (EL), Cold Cathode Fluorescent Lamp (CCFL), External Electrode Fluorescent Lamp (EEFL), Flat Lamp (FL), and so on. Among them, the LED is being used as a light source for an LCD backlight owing to the advantages of low power consumption, longer life, and mercury pollution elimination.

In conventional LEDs, a module is used in which a package of LEDs having a single optical property is arranged in a line. However, when a single LED package is used, color reproduction is just 79% of the entire range of indicated in the National Television System Committee (NTSC) standard. Also, matching a peak wavelength of an LED package and a peak wavelength of a color filter of an LCD liquid crystal effects color reproduction, light efficiency, and a white color coordinate, sensitively.

SUMMARY

Aspects of the general inventive concept provide a backlight assembly including a white LED and a QD (Quantum Dot) LED, and a display apparatus including the backlight assembly.

According to an aspect of an exemplary embodiment, there is provided a display panel; and a backlight unit disposed on a rear surface of the display panel and discharging light to the display panel, the backlight unit comprising white light emitting diodes (LEDs) and Quantum Dot (QD) LEDs.

The backlight unit may further include a light guide plate that distributes light emitted from the white LEDs and the QD LEDs, and the white LEDs and the QD LEDs may be disposed to alternate with each other along at least one edge of the light guide plate. For example, the white LEDs and the QD LEDs may be arranged along the left edge and the right edge of the light guide plate, or along the upper edge and the lower edge of the light guide plate.

The backlight unit may be disposed along at least one edge of the light guide plate and may further include an LED bar on which the white LEDs and the QD LEDs are disposed.

The backlight unit may further include a light guide plate that distributes light emitted from the white LEDs and the QD LEDs to the display panel, and the white LEDs and the QD LEDs may be disposed to alternate with each other on a rear surface of the light guide plate.

According to another aspect of an exemplary embodiment, there is provided a backlight assembly for providing a display panel with backlight, an emitting unit including white light emitting diodes (LEDs) and Quantum Dot (QD) LEDs and discharging light, and a light guide plate that distributes light emitted from the emitting unit to the display panel.

The emitting unit may include an LED bar on which the white LEDs and the QD LEDs are disposed in an alternating manner with each other, and the LED bar may be mounted on one or two opposing edges of the light guide plate.

LED bars may be mounted on the left edge and the right edge of the light guide plate, or on the upper edge and the lower edge of the light guide plate.

The white LEDs and the QD LEDs may be disposed in an alternating manner with each other on a rear surface of the light guide plate.

BRIEF DESCRIPTION OF THE DRAWINGS

The above and/or other aspects will become apparent and more readily appreciated from the following description of the embodiments, taken in conjunction with the accompanying drawings of which.

DETAILED DESCRIPTION

Reference will now be made in detail to the exemplary embodiments, examples of which are illustrated in the accompanying drawings, wherein like reference numerals refer to the like elements throughout. The exemplary embodiments are described below sequentially by referring to the figures.

Figure 1:
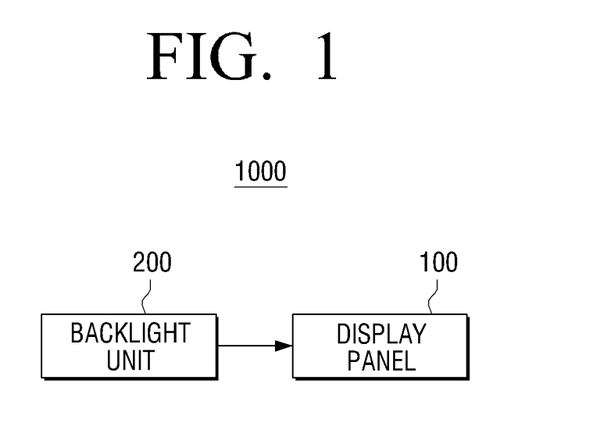
FIG. 1 is a block diagram illustrating a structure of a display apparatus according to an exemplary embodiment.

FIG. 1 is a block diagram illustrating a structure of a display apparatus according to an exemplary embodiment. Referring to FIG. 1, a display apparatus 1000 includes a display panel 100 and a backlight unit 200.

The display panel 100 is configured to display an image. Specifically, the display panel 100 may be implemented as diverse color liquid crystals, and may display an input image on a screen by visualizing an image signal with adjustment of a penetration ratio of backlight generated in the backlight unit 200. For example, the display panel 100 may be implemented as an LCD panel in which two substrates are formed. Each of the two substrates has electrodes that are disposed to face the surface of the LCD panel, and an electrical field is generated between the electrodes. Liquid crystal materials are injected between two substrates, and the liquid crystal molecules are moved by the electrical field generated by applying voltages to the electrodes. An image or a text is displayed by a transmittance of the backlight, which is changed according to the change of the electrical field.

The backlight unit 200 is disposed at a rear part of the display panel 100 and discharges light to the display panel 100. Specifically, the backlight unit 200 includes white LEDs and Quantum Dot (QD) LEDs and distributes light emitted from the LEDs so that light may be discharged to the panel surface uniformly. At this time, the white LEDs and the QD LEDs may be arranged alternatively with each other.

Hereinafter, a specific structure of the backlight unit 200 will be described in detail referring to FIG. 2.

Figure 2:
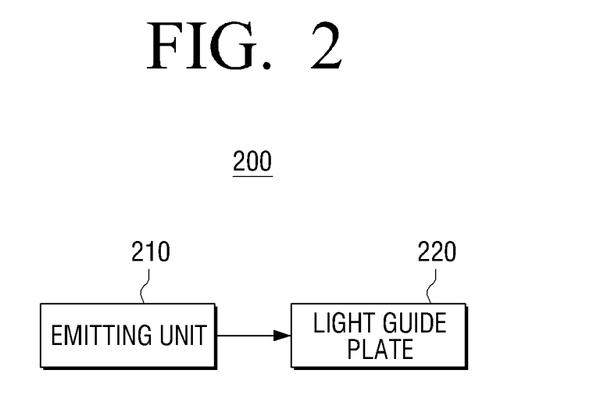
FIG. 2 is a block diagram illustrating a structure of a backlight unit according to an exemplary embodiment.

FIG. 2 is a block diagram illustrating a structure of a backlight unit according to an exemplary embodiment. Referring to FIG. 2, a backlight unit 200 includes an emitting unit 210 and a light guide plate 220.

The emitting unit 210 includes at least one light emitting diode and is configured to supply light. The light emitting diode may be implemented as an LED module, which includes a white LED and a QD LED. The white LED and the QD LED may be arranged alternatively with each other to form an LED bar.

An LED is an element that emits light by using an electroluminescence effect (electric field emitting) which is generated when voltage is applied to a semiconductor. Material whose emission wavelength is in a visible region or a near infrared region, having a high light emitting efficiency, and capable of p-n junction creation is suitable for material of an LED. Examples of such the material are GaN, GaAs, GaP, GaAsl-x Px, Gal-xAlxAs, InP, Inl-xGaxP, and the like, also called semiconductor alloys.

The light guide plate 220 is configured to distribute light emitted from the emitting unit 210 to the display panel 100. Specifically, the light guide plate 220 distributes light incident from the emitting unit 210 by multiple reflection to a whole front side of the light guide plate, such that light may be transmitted to the panel surface of the display panel 100 uniformly.

Hereinafter, a specific structure of the backlight unit 200 will be described in detail referring to FIG. 3A and FIG. 3B.

Figure 3A:
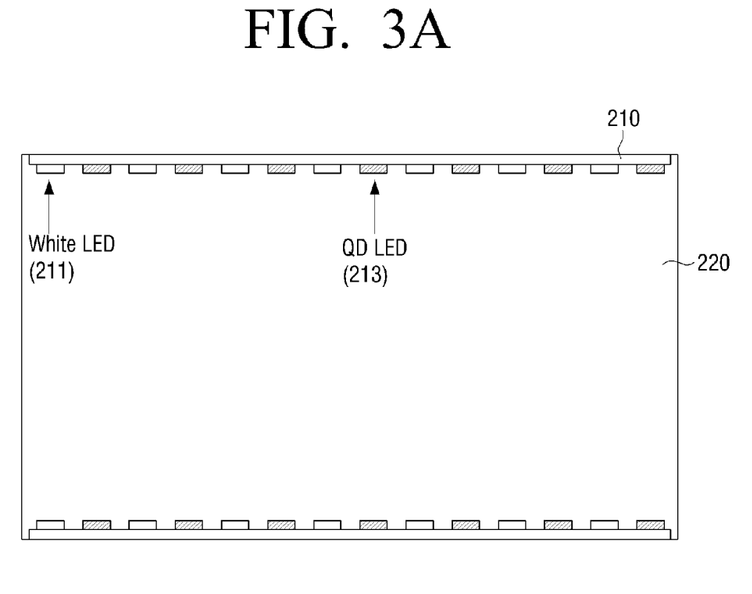
FIG. 3A is a diagram of plan view of a backlight unit according to an exemplary embodiment.

FIG. 3A is a plan view of a backlight unit 200 according to an exemplary embodiment. Generally, a backlight is divided into a direct type and an edge type according to the disposition of the light source. A direct type reflects and diffuses light emitted from light sources by disposing light sources at the rear surface of an LCD panel on the whole, a diffusion plate at the front side of the light sources, and a reflection plate at the rear side of the light sources. However, the direct type has a limitation in how slim the LCD panel may be because a distance between the light source and the diffusion plate affects the luminance uniformity that may be obtained.

Accordingly, as shown in FIG. 3A, the backlight unit 200 may be embodied as the edge type unit. That is, light sources are disposed at one edge of a light guide plate, and at the other edge across the light guide plate, respectively, and light emitted from the light sources is incident into the side of the light guide plate. At this time, light incident into the light guide plate is distributed into the entire inside of the light guide plate by total reflection. A surface light source may be embodied through light mixing by using an optical film, back reflection, and so on, thereby producing a backlight of the LCD panel. As such, light sources are attached at the sides of the light guide plate in the edge type, which allows for the LCD panel to remain slim and still increase luminance uniformity using the reflection surface.

Accordingly, LED bars 210 producing light are mounted on both edges of the light guide plate, and white LEDs 211 and QD LEDs 213, as light emitting diodes, are arranged thereon alternatively with each other along the edge in this exemplary embodiment. For example, the LEDs are arranged W-Q-W-Q-W-Q etc. Specifically, the LED bars 210 may be mounted on the upper edge and the lower edge, respectively, or at the left edge and the right edge of the light guide plate 220, respectively. Accordingly, the white LEDs 211 and the QD LEDs 213 may be disposed alternatively with each other in a line at the upper edge and the lower edge, or at the left edge and the right edge of the light guide plate 220, respectively.

Figure 3B:
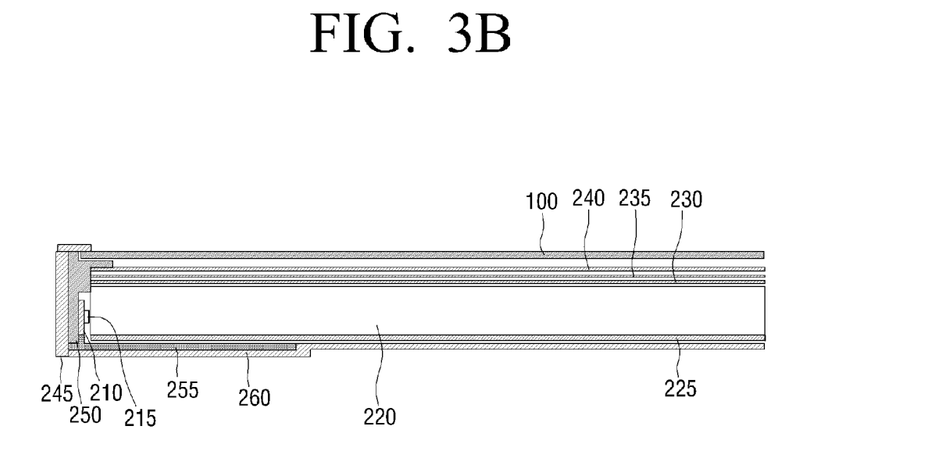
FIG. 3B is a diagram of side view of a backlight unit according to an exemplary embodiment.

FIG. 3B is a side view of the backlight unit 200 according to an exemplary embodiment. Hereinafter, a case that a display panel is implemented as an LCD panel is introduced, for convenience of description.

An LED bar 210 is mounted on the edge of a light guide plate 220 and includes at least one LED 215 emitting light to the side of the light guide plate 220. For example, the at least one LED 215 may include a white LED and a QD LED, which are arranged alternatively with each other on the LED bar 210.

The light guide plate 220 is configured to distribute light incident from the LED 215 and transmit the same to a panel surface of an LCD panel 100 uniformly. As such, the light guide plate 220 may be implemented as a Prism LGP or a Lenticular LGP.

A reflection layer 225 is deposited on the lower surface of the light guide plate 220 and changes a direction of light emitted from the LED bar 210 so as to direct the light toward a diffusion sheet 230. And, the reflection layer 225 enables to increase light intensity to LCD cells and prevent light loss. Material for the reflection layer is a film such as poly Ethylene (PE), Poly Ethylene terephthalate (PET) resin, or the like.

Optical films 230, 235, 240 are deposited on the upper surface of the light guide plate 220, and, diffuse and spread light incident through the light guide plate 220, which results in increasing luminance uniformity. The optical film may be implemented as a diffusion sheet 230, a prism sheet 235, and a Dual Brightness Enhancement Film (DBEF) sheet 240, and even though it is shown that all of the above are used in FIG. 3B, in other exemplary embodiments only one of the above may be used.

Other than the above, the backlight unit may further include a top chassis 245, a middle mold 250, an LED PCB 255, and a bottom chassis 260, but those components are not related to the technical features of the present inventive concept, therefore, detail descriptions of these features are omitted.

As described above, the white LED and the QD LED are used as light sources in the backlight unit and the display apparatus including the same according to an exemplary embodiment, and the white LED and the QD LED are arranged alternatively with each other. As a result, it is possible to embody a much wider range of color than when a conventional single LED is used. In addition, the QD LED has a narrow half amplitude, which enables excellent matching with a color filter of an LCD panel and thereby increases light efficiency. Particularly, an red (R) region and a green (G) region may embody a high color expression property.

In the above described exemplary embodiment, the white LED is used, but other types of LEDs may be used along with the QD LED in other exemplary embodiments.

In the above described exemplary embodiment, the white LEDs and the QD LEDs are arranged alternatively with each other one by one, but this is just an example. The white LEDs and the QD LEDs may be arranged alternatively with each other by two or more LEDs per every alternation (e.g., W-W-Q-Q-W-W-Q-Q, etc.), and it is also possible to have a greater or fewer number of white LEDs as compared with the number of QD LED per alternation (e.g., W-Q-Q-W-Q-Q, or W-W-W-Q-W-W-W-Q, etc.).

In the above described exemplary embodiment, a backlight unit of the edge type is used, but this is just an example. That is, the present inventive concept may be applied to the direct type as well as the edge type.

In the direct type case, white LEDs and QD LEDs may be disposed alternatively with each other on the rear surface of the light guide plate. Specifically, an LED module on which white LEDs are disposed sequentially and an LED module on which QD LEDs are disposed sequentially may be arranged alternatively with each other on the rear surface of the light guide plate (e.g., a row of W, a row of Q, a row of W, a row of Q, etc.). Also, white LEDs and QD LEDs may be arranged alternatively with each other along the all lines on the rear surface of the light guide plate (e.g., Row1: W-Q-W-Q, etc.; Row2: Q-W-Q-W, etc.; Row3: W-Q-W-Q, and so on).

Additionally, for the edge type, the white LEDs and the QD LEDs may alternatively be disposed at only one edge of the light guide plate, as opposed to at both edges of the light guide plate as described above. That is, an LED bar, which white LEDs and QD LEDs are arranged alternatively with each other thereon, may be disposed at only one edge of the light guide plate.

Figure 4:
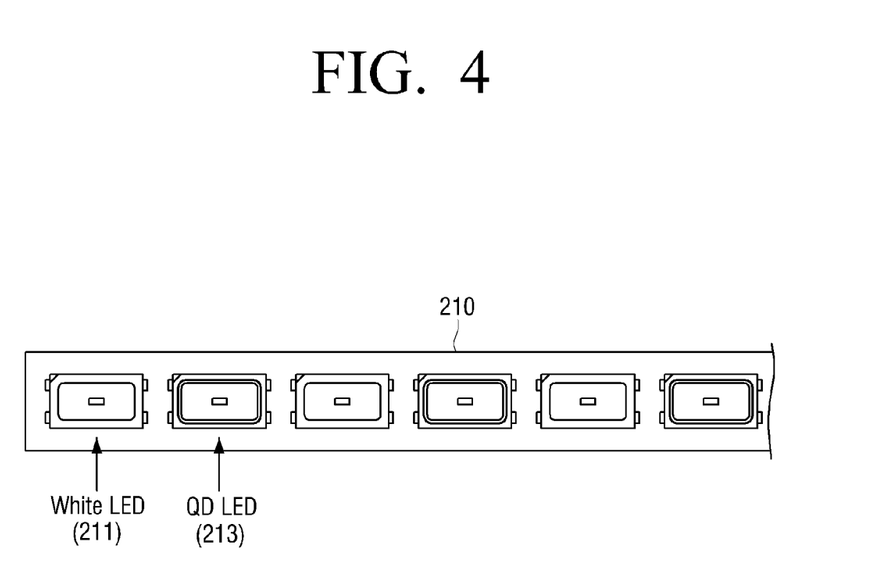
FIG. 4 is a diagram of plan view of an LED bar according to an exemplary embodiment.

FIG. 4 is a plan view of an LED bar 210 according to an exemplary embodiment. As shown in FIG. 4, the LED bar 210 includes at least one of a white LED 211 and at least one of a QD LED 213, which are arranged alternatively with each other at regular intervals.

Figure 5A:
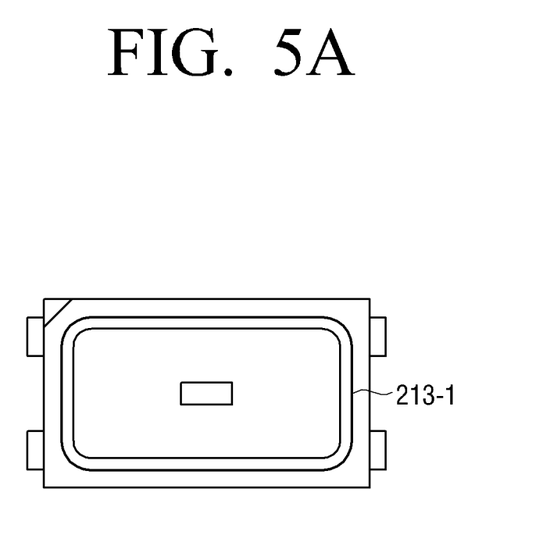
FIGS. 5A and 5B are diagrams of plan view of a Quantum Dot (QD) LED and a white LED, respectively, according to an exemplary embodiment.
Figure 5B:
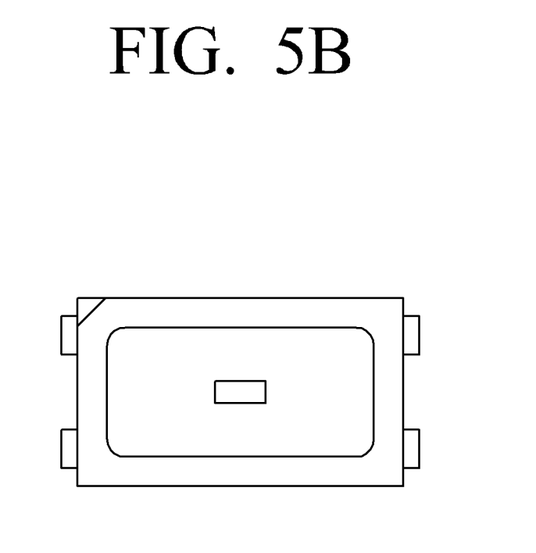

FIGS. 5A and 5B are plan views of a QD LED and a white LED, respectively, according to an exemplary embodiment.

FIG. 5A illustrates a plan view of a QD LED. As shown in FIG. 5A, the QD LED may be implemented by applying silicon on a blue LED chip or an Ultra Violet (UV) LED chip and combining QD phosphor 213-1 thereon.

FIG. 5B illustrates a plan view of a white LED, which may be implemented by applying phosphor on a blue LED chip or a UV LED chip. It may also be implemented by applying phosphor on two or three different colored LED chips (i.e., a multi chip).

Figure 6:
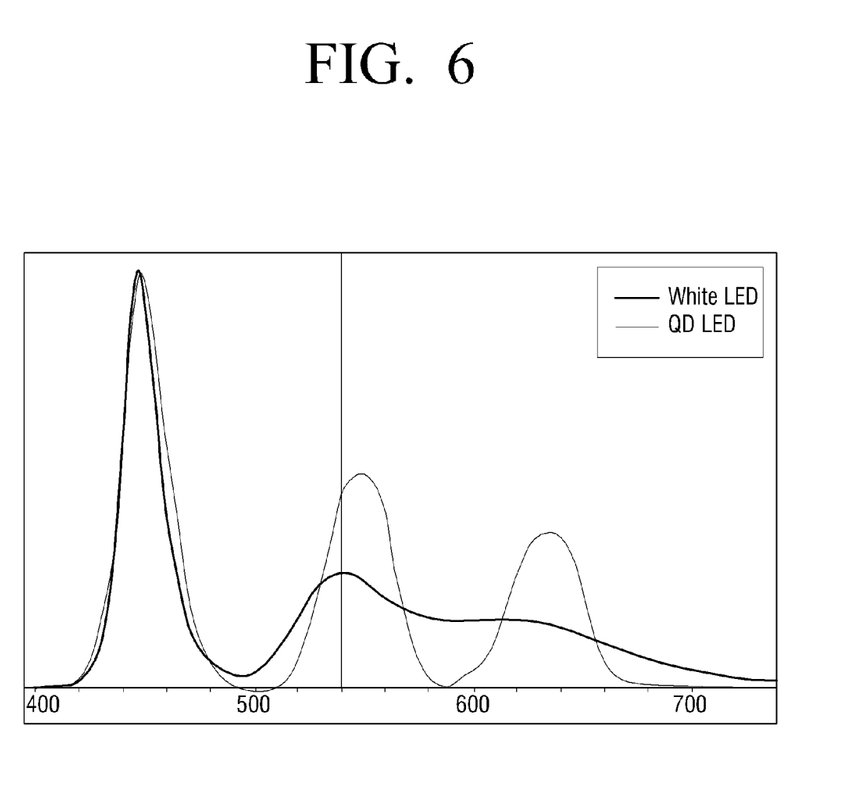
FIGS. 6 and 7 are diagrams to explain characteristics of a white LED and a QD LED according to an exemplary embodiment.
Figure 7:
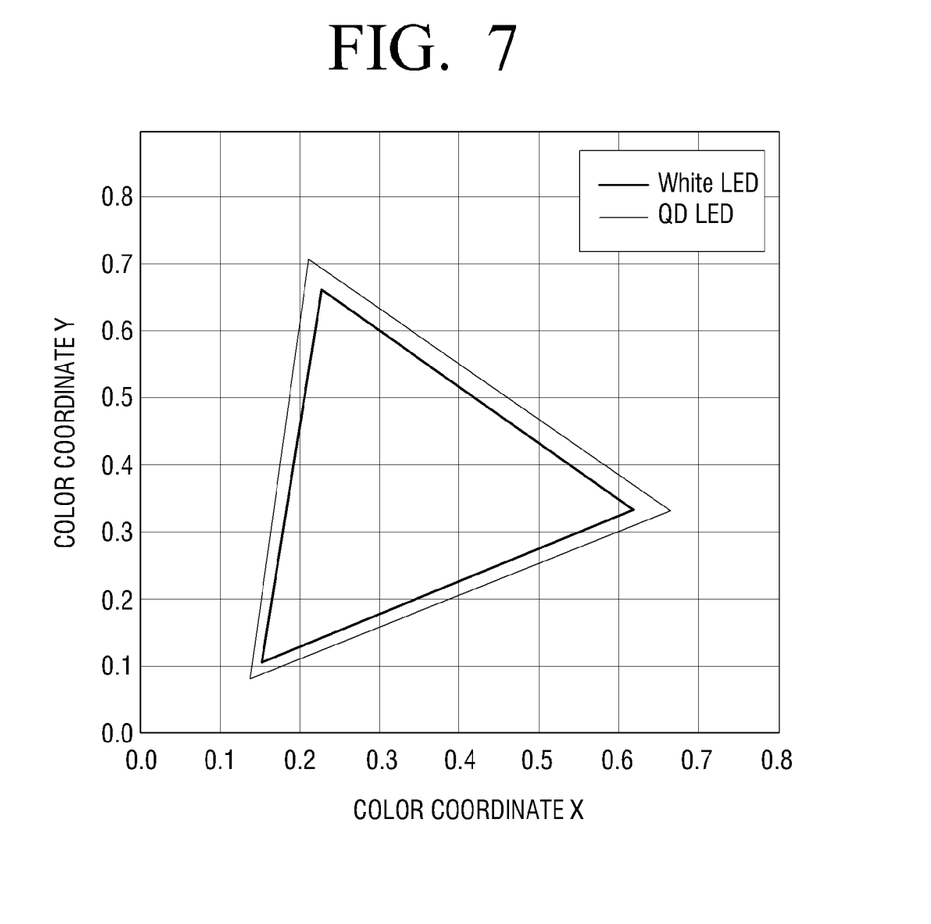

FIGS. 6 and 7 are diagrams to explain characteristics of a white LED and a QD LED according to an exemplary embodiment. As shown in FIGS. 6 and 7, the QD LED has higher peak value than the white LED has in the R, G and B wavelength regions, which enables the QD LED to have high color reproduction. Therefore, when implementing a backlight assembly, much higher color reproduction may be achieved when the QD LED and the white LED are combined in the assembly.

As described above, according to exemplary embodiments, it is possible to embody a much wider rage of color than when a conventional single LED light source is used. That is, since the QD LED applying QD phosphor that generates strong fluorescence in a narrow wavelength band and has excellent color reproduction is used as a light source, it is possible to embody higher color expression property than when a conventional single LED light source was used.

Moreover, the QD LED has a disadvantage in that the luminance declines over time, thus, the QD LEDs are arranged alternatively with the white LEDs. As a result, color reproduction is strengthened and the decline in luminance is improved. In addition, since the half amplitude of the QD phosphor is narrow, a matching ratio with a color filter of the LCD liquid crystal is high, and accordingly light efficiency is increased.

As described above, according to the aspects of the present general inventive concept, a backlight assembly including white LEDs and QD LEDs and a display apparatus including the backlight assembly may be embodied, so that the display apparatus may embody a wider range of color than in a panel using a conventional LED light source and increased light efficiency with excellent matching with a color filter of LCD liquid crystal due to narrow half amplitude of the QD LED.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A display apparatus comprising:
a display panel; and
a backlight unit disposed on a rear surface of the display panel and discharging light to the display panel, the backlight unit comprising white light emitting diodes (LEDs) and Quantum Dot (QD) LEDs, the QD LEDs comprising a QD phosphor.

2. The display apparatus of claim 1,
wherein the backlight unit further comprises a light guide plate that distributes light emitted from the white LEDs and the QD LEDs to the display panel; and
wherein the white LEDs and the QD LEDs are arranged to alternate with each other along at least one edge of the light guide plate.

3. The display apparatus of claim 2, wherein the white LEDs and the QD LEDs are disposed along the left edge and the right edge of the light guide plate, or along the upper edge and the lower edge of the light guide plate.

4. The display apparatus of claim 2,
wherein the backlight unit is disposed at at least one edge of the light guide plate; and
wherein the backlight unit further comprises an LED bar on which the white LEDs and the QD LEDs are arranged.

5. The display apparatus of claim 1,
wherein the backlight unit further comprises a light guide plate that distributes light emitted from the white LEDs and the QD LEDs to the display panel; and
wherein the white LEDs and the QD LEDs are disposed in an alternating manner with each other at at least one edge of the light guide plate.

6. A backlight assembly supplying a display panel with backlight, the backlight assembly comprising:
an emitting unit configured to include white light emitting diodes (LEDs) and Quantum Dot (QD) LEDs and emit light, the QD LEDs comprising a QD phosphor; and
a light guide plate configured to distribute light emitted from the emitting unit to the display panel.

7. The backlight assembly of claim 6,
wherein the emitting unit includes an LED bar on which the white LEDs and the QD LEDs are arranged in an alternating manner with each other; and
wherein the LED bar is mounted on an edge of the light guide plate.

8. The backlight assembly of claim 7, wherein the LED bar comprises two LED bars, and the two LED bars are mounted on one edge of the light guide plate, and another edge of the light guide plate across from the one edge, respectively.

9. The backlight assembly of claim 7, wherein the LED bar comprises two LED bars, and the two LED bars are mounted on a left edge and a right edge of the light guide plate, respectively, or on an upper edge and a lower edge of the light guide plate, respectively.

10. The backlight assembly of claim 6, wherein the white LEDs and the QD LEDs are disposed in an alternating manner with each other at at least one edge of the light guide plate.

11. A display apparatus comprising:
a display panel; and
a backlight unit disposed on a rear surface of the display panel, the backlight unit comprising a light guide plate that guides the light from the backlight unit toward the display panel, and a plurality of white light emitting diodes (LEDs) and a plurality of Quantum Dot (QD) LEDs arranged along the light guide plate so as to alternate with each other, the QD LEDs comprising a QD phosphor.

12. The display apparatus of claim 11, wherein individual ones of the white LEDs alternate with individual ones of the QD LEDs along a line.

13. The display apparatus of claim 11, wherein a first number of white LEDs alternates with a second number of QD LEDs along a line.

14. The display apparatus of claim 13, wherein the first number is the same as the second number.

15. The display apparatus of claim 13, the light guide plate comprising an LED bar, and the line of LEDs is arrange along the LED bar.

16. The display apparatus of claim 15, wherein the LED bar is arranged along an edge of the light guide plate.

* * * * *